United States Patent [19]

Pasdera et al.

[11] Patent Number: 4,775,899

[45] Date of Patent: Oct. 4, 1988

[54] APPARATUS FOR DESKEWING SUCCESSIVELY OCCURRING BLOCKS OF DATA

[75] Inventors: Leonard A. Pasdera, San Carlos; Maurice G. Lemoine, Redwood City, both of Calif.

[73] Assignee: Ampex Corporation, Redwood City, Calif.

[21] Appl. No.: 851,078

[22] Filed: Apr. 11, 1986

[51] Int. Cl.⁴ .............................................. H04N 9/89
[52] U.S. Cl. .................................. 358/339; 360/36.2; 358/323
[58] Field of Search ............... 358/339, 337, 320, 323; 360/36.2, 36.1; 371/1

[56] References Cited

U.S. PATENT DOCUMENTS

3,483,540 12/1969 Damron ............................. 360/36.1
3,497,634 2/1970 Damron et al. ..................... 360/36.1
3,708,783 1/1973 Hedin ................................ 360/36.2
4,054,921 10/1977 Tatami .............................. 360/36.2
4,577,236 3/1986 Takanashi ......................... 358/320
4,714,965 12/1987 Yoshinaka et al. ................ 360/36.2

Primary Examiner—L. T. Hix
Assistant Examiner—David M. Gray
Attorney, Agent, or Firm—George B. Almeida; Richard P. Lange

[57] ABSTRACT

A deskew processor includes first and second memory units each having independent data write control circuits and data read control circuits. The write control loads successive data into respective memory units as it is received, and the read control reads the data out of the memory units into a data selector circuit as determined by a data selector control circuit. The latter determines the presence of any data overlap and delays read out of data via the data selector circuit until the previous data is completely read, thereby deskewing the successive data.

19 Claims, 7 Drawing Sheets

FIG. 5

FIG_6A

FIG_6D

FIG_7

APPARATUS FOR DESKEWING SUCCESSIVELY OCCURRING BLOCKS OF DATA

BACKGROUND AND SUMMARY OF THE INVENTION

The invention relates to recovering data from multiple head video recorders and more particularly, to deskew circuitry for removing overlap in data recovered via multiple head recorder systems or via other data generating sources, where the overlap may occur during an active video display period.

In present and future sophisticated multiple head video recorders such as, for example, helical broadcast videotape recorders (VTR) and future digital videotape recorders (DVTR), multiple heads are used to record and playback video signals at, for example, reduced data rate or reduced tape wrap angle. By way of example only, one possible multiple head configuration includes two heads located 180 degrees apart on a helical scanner device, such that only one head at a time records data during a pass period. The pass period corresponds to one head scan across the tape, and at least two or more pass periods (for example, three pass periods) are required in one field of time. To provide continuous data recording and playback, one head begins recording its respective track on tape while the previous head finishes recording its track on the tape. The data being recorded is switched alternately from one head to the other head during the blanking period of the video signal, whereby the heads record the signal during the active pass period as they successively scan their tracks, thereby providing a continuous recording of the data.

Such an alternate use of heads for recording data can cause an information overlap condition during the subsequent playback operation. The overlap can be created by head misalignment as between different recorders, tape dimensional changes, or during the variable playback speeds used for special playback functions. The overlap may occur during stop or slow motion modes of operation because of the difference between the static and dynamic track lengths when operating in such special modes. Thus, an overlap condition occurs where the data recovered by a second head is advanced in time from its "correct" timing, whereby the beginning of the second data period overlaps the end of a previous data period corresponding to data generated by the previous head. This overlap condition causes playback data to be received simultaneously from both heads during the overlap period instead of being received from one head at a time in alternate succession.

In another multiple head configuration, a dual write head may contain two record gaps and an associated dual read head may contain two playback gaps. In such a system, a single incoming stream of data is split into two electronic data recording paths and is selectively recorded by the two record gaps simultaneously. Likewise, the recorded data then is played back by the two playback gaps simultaneously, and then is reassembled into a single output stream of data corresponding to the initial incoming data. Thus, during playback the system has two active playback electronics functioning continuously. If overlap occurs between successive blocks of data when reading back the split data, there are four active channels of required playback data occurring for only two electronic playback paths.

In a two head system such as mentioned above where it takes three passes to provide one field, two of the three switches between heads in one field occur during the active video display period. It follows that the occurrence of an overlap condition during the active video display period will cause a visible disturbance in the picture. To remedy this undesirable situation, present systems require that any overlap condition may occur only during the blanking period of the video signal. More particularly, the amount of overlap must be limited in its time of occurrence as well as in size to insure that it occurs only during the blanking interval.

The invention removes the requirement that the overlap, if it occurs, must be restricted in time to insure that it occurs only during the blanking period of the video signal when reproducing the recorded signal. The removal of this requirement, in turn, adds flexibility to the playback process in that special functions may be performed by a recorder in the playback mode such as stop or slow motion where overlaps may occur during the active video interval, since the invention insures that any overlap which occurs during the active display period is removed.

To this end, the invention provides for processing data as it is received alternately from multiple heads, using one playback circuit. A deskew processor circuit is placed in a playback processing circuit, preferably as far forward in the circuit as possible to further minimize the amount of multiple channel processing electronics required. The deskew processor circuit includes first and second memory units having respective first and second memories with independent write and read control circuits. The write control circuits alternately load data from the heads into the respective memories at the off-tape data rate, and the read control circuits independently read data from the respective memories and supply the data to a data selector means via respective data buses at a read data reference rate. Thus, the write and read control circuits for the respective memories are synchronized to respective data timing signals such as, for example, tape horizontal wherein however, the read timing signals may be delayed in accordance with detected overlap conditions to remove the overlap. A data selector control means is coupled to receive the respective tape horizontal signals indicative of the data timing as data is played back by the heads, determines the amount of overlap if any exists, and correspondingly determines the amount of delay to generate prior to switching the data selector means in response to the overlap. Thus the delay generated by the data selector control means in one channel inhibits a reading mode in the other channel until the overlap is removed, to thus deskew the data.

DESCRIPTION OF THE PREFERRED EMBODIMENTS

Figures 1, 2, 3, 4:
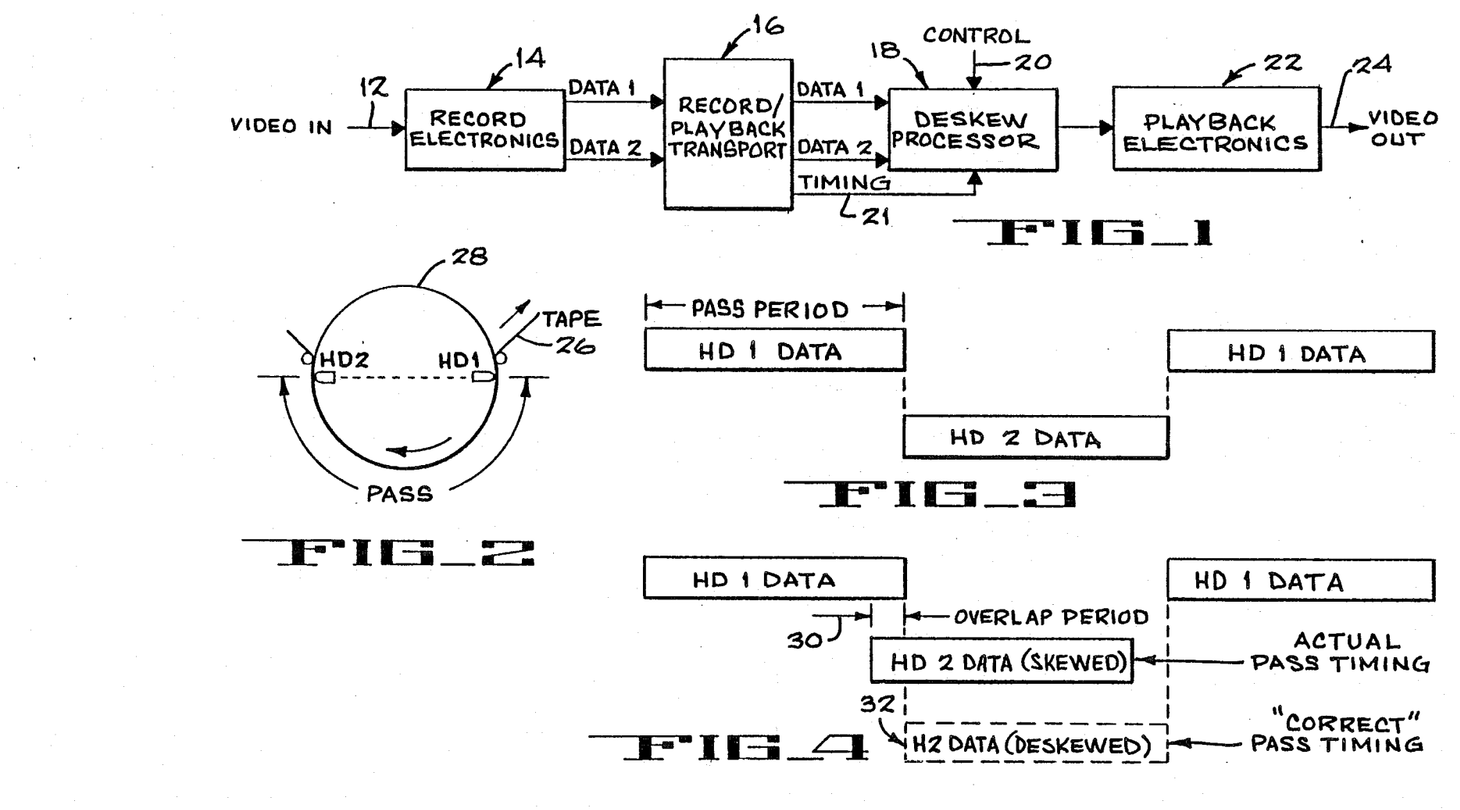
FIG. 1 is a simplified block diagram of the invention as used with a multiple-head recorder apparatus.
FIG. 2 is a simplified diagram of a multiple head scanner configuration typically used in the system of FIG. 1.
FIG. 3 is a diagram exemplifying the record mode active pass timing of data recorded by the two heads of FIG. 2.
FIG. 4 is a diagram exemplifying the playback mode active pass timing of the data of, for example, FIG. 3, when played back with overlap.

In FIG. 1, an input video signal is supplied via an input 12 to a record electronics circuit 14, wherein it is split into two active data record channels which are coupled in turn to two respective record heads of a videotape recorder 16. The data are recorded as alternate blocks of DATA 1 and DATA 2 signals in a recording medium. By way of example only, a recorder using two record channels and heads, and two playback channels and heads, is illustrated herein but a multiple number of heads and data channels other than two may be used. The playback heads read out alternate blocks of DATA 1 and DATA 2 via respective playback channels, which supply a deskew processor circuit 18 selectively operated by various control signals on a control line 20. An off-tape horizontal sync signal is recovered during playback as represented by a timing line 21, and provides the off-tape timing information for the respective blocks of data. The resulting deskewed signal from the deskew processor is supplied to playback electronic circuits 22 which provide a video output signal via an output 24.

Although the environment herein employed by way of description is that of a video signal processed via a videotape recorder with two heads, it is to be understood that the invention contemplates use with any multiple head recorder having pass periods wherein overlap may occur during the active data, such as data recorders which supply data block timing signals, or recorders where the data or video is recorded in non-real time. Further, the deskew processor may be employed to deskew successively occurring blocks of data that are generated via other than a playback multiple head system, wherein overlap may occur between successively received data blocks. For example, the invention may be used to deskew overlap in data received via data transmission systems.

FIG. 2 depicts a two head helical scanner configuration, wherein a first head is radially disposed 180 degrees from a second head, to define a pass period during which only one head at a time is recording data. The data is recorded on a magnetic tape 26 wrapped about a scanner drum 28 over a circumference thereof greater than 180 degrees. As depicted herein, the pass period is 180 degrees, and generally two or more pass periods are required in one field of time.

FIG. 3 depicts the active pass periods for each of the two heads 1 and 2 during the recording of successive blocks of DATA 1 and 2 respectively. It is this alternate use of multiple heads during the recording of data that exemplifies a cause for the overlap condition of previous mention during the subsequent playback mode of operation. To illustrate, FIG. 4 depicts an example of an overlap condition where head 2 active data is advanced in time from its "correct" pass timing to cause the overlap period relative to the head 1 active data, as indicated by numeral 30. The "correct", that is, deskewed pass timing is indicated by the dashed data block and numeral 32.

Figure 5:
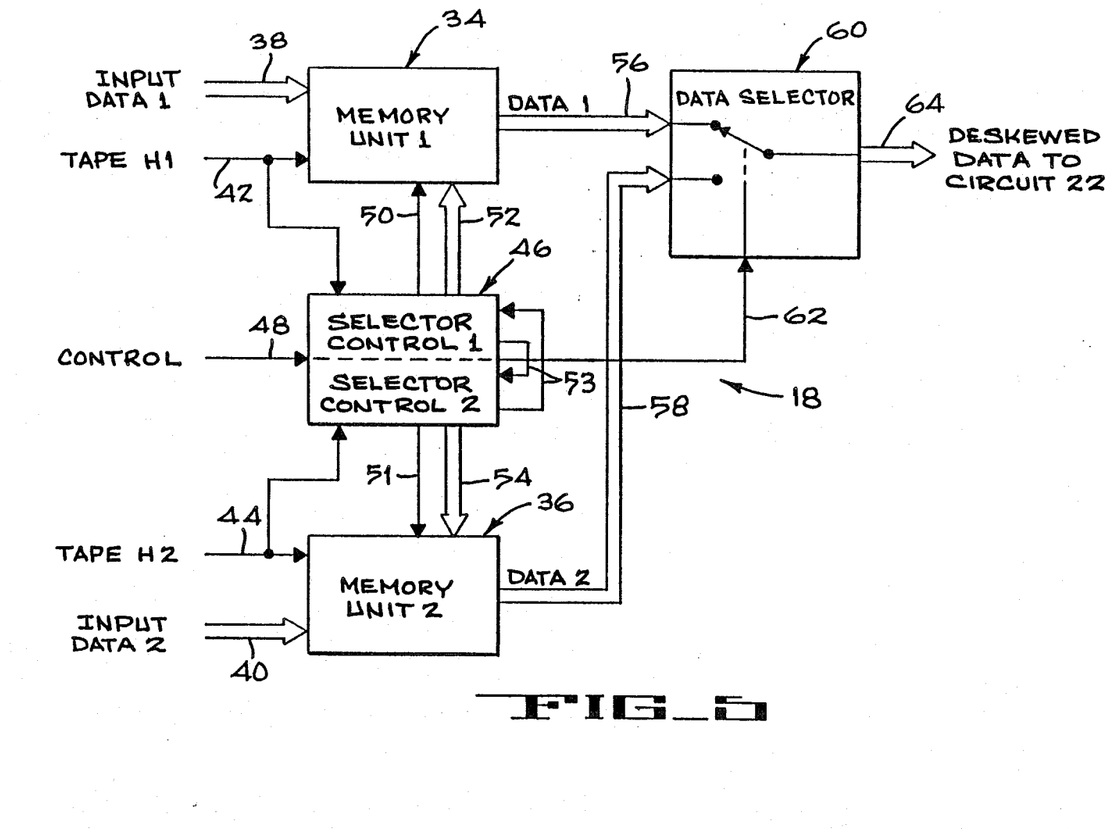
FIG. 5 is a block diagram of the invention deskew processor circuit depicted in FIG. 1.

FIG. 5 shows a simplified block diagram of the deskew processor circuit 18 depicted in FIG. 1, which removes the data overlap in accordance with the invention, whereby the playback electronic circuits 22 receive the deskewed data, that is, data from only one head at a time. Similar components of the FIGS. 1 and 5 are similarly numbered. Thus input data from head 1 and head 2 are supplied to a data 1 memory unit 34 and a data 2 memory unit 36 via data buses 38, 40 respectively. Tape horizontal signals such as H sync, indicative of the respective timing of data 1 and data 2, and herein termed TAPE H1 and H2, are supplied to the respective memory units 34, 36 as well as to respective portions of selector control circuits 46, via timing lines 42, 44. The selector control circuits 46 are formed of two substantially identical circuits depicted herein as selector control 1 and 2, wherein the memory unit 34 and selector control 1 define a first channel for processing the DATA 1 signals, and the memory unit 36 and selector control 2 define a second channel for processing the DATA 2 signals. The selector control circuits 46 receive control signals on control lines 48 (corresponding to the control line 20 of FIG. 1) and in turn supply various timing control, memory address and write/read signals to the memory units 34, 36 via respective lines 50, 51 and buses 52, 54, further described in the FIGS. 6, 7. The selector controls 1 and 2 also supply each other with read control signals as depicted by lines 53, which signals determine the extent of delay of the read mode for alternate channels to compensate for any existing overlap.

The DATA 1 and DATA 2 stored in the memory units 34, 36 are supplied via respective data buses 56, 58 to a data selector (switcher) 60, as directed by a switch control signal from the selector control circuits 46 on a control line 62. The switch control signal is timed in accordance with the overlap condition, and therefore switches the data selector 60 at a time corresponding to the extent of delay detected by the selector controls 1 and 2 to effect the deskewing process, as further described below. The data selector 60 supplies the deskewed DATA 1 and DATA 2 to the playback electronic circuit 22 via an output data bus 64.

Figure 6A:
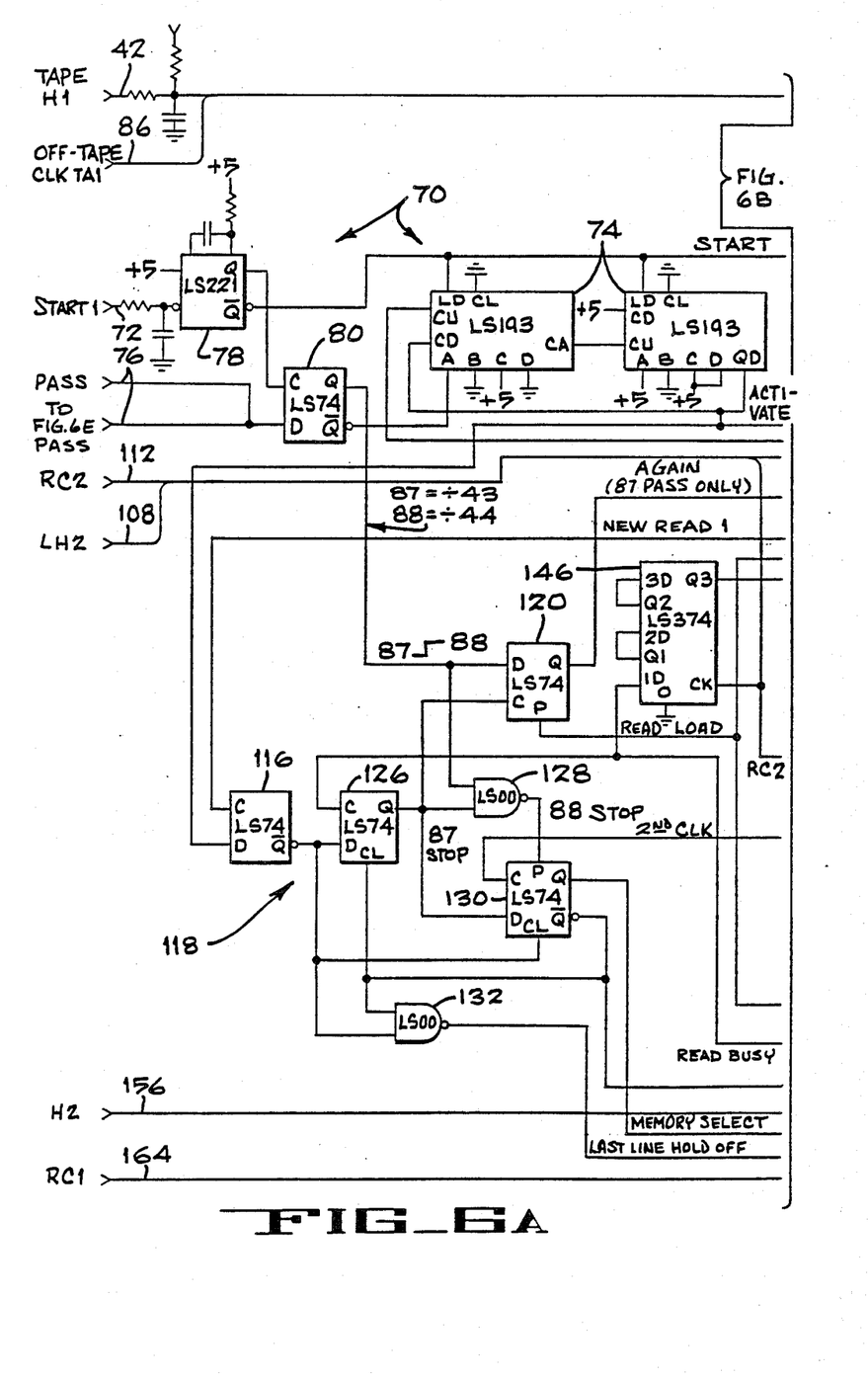
FIGS. 6A-6D are a combined schematic and block diagram illustrating an implementation of the deskew processor circuit of FIG. 5.
Figure 6B:
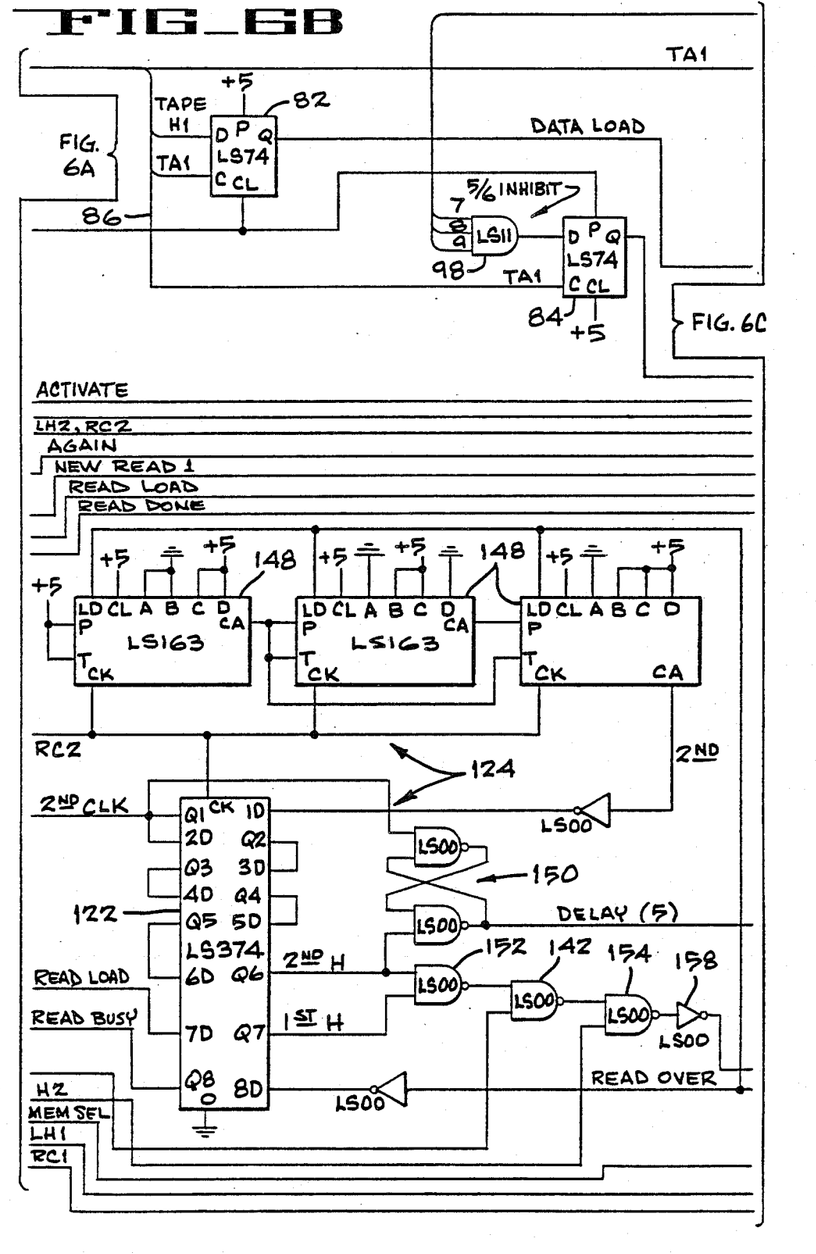
Figure 6C:
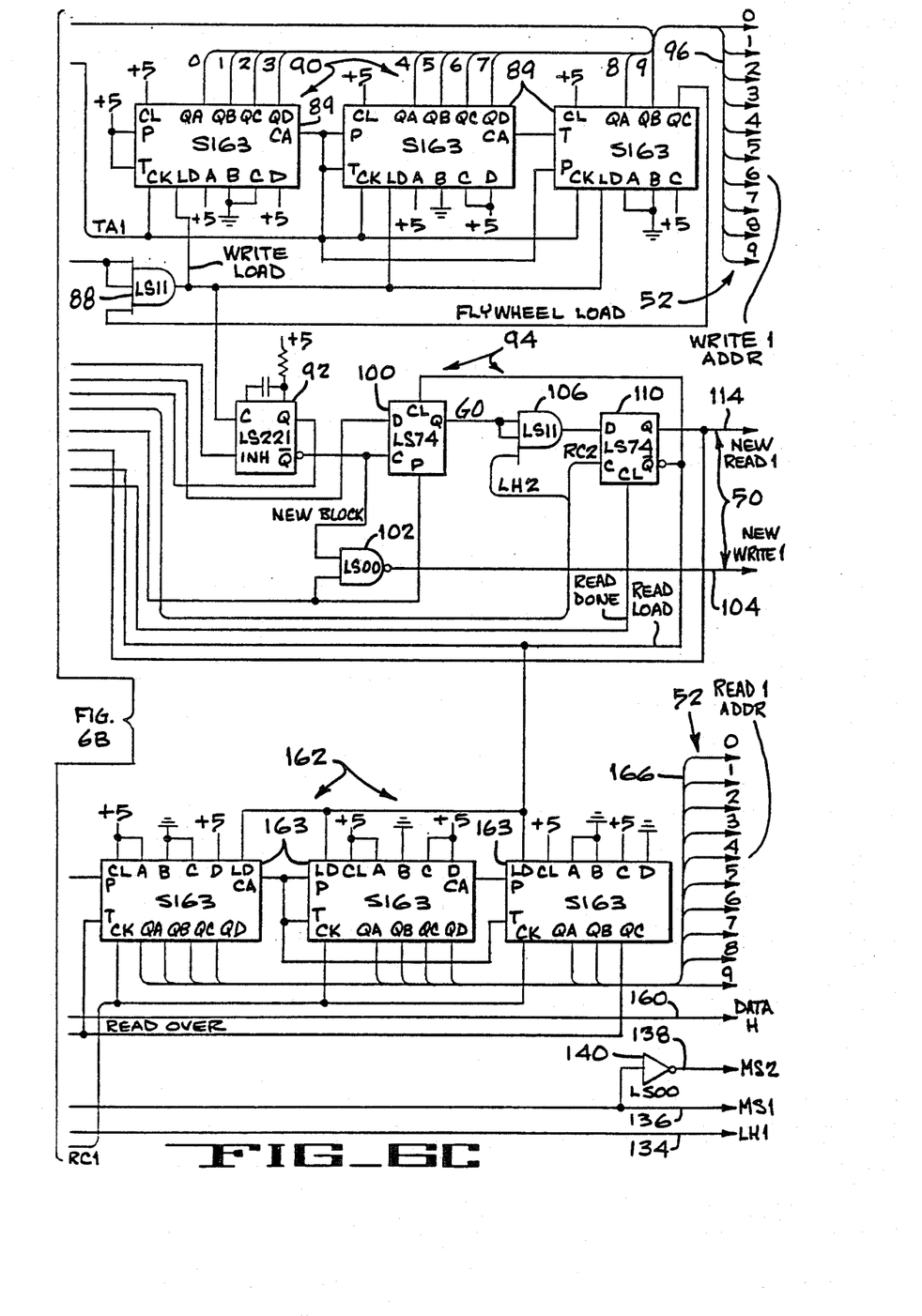
Figure 6D:
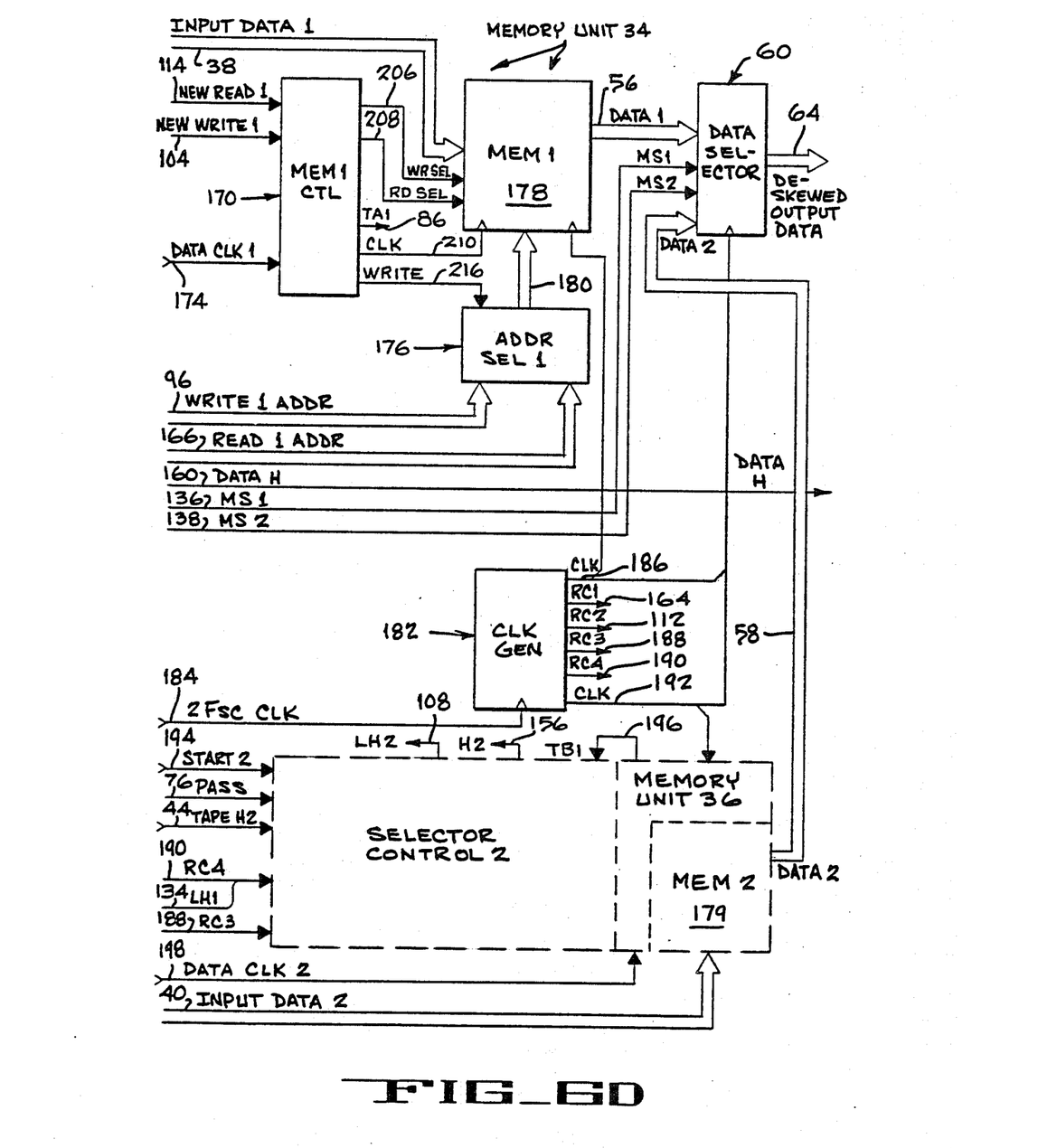

FIGS. 6A through 6D show in further detail by way of example only, one implementation of the deskew processor circuit 18 of FIG. 5 where the data is processed in 2 television line units. The circuit is readily applied to use with processing data in single television line units as well. FIGS. 6A, 6B and 6C depict a first channel, namely selector control 1, of the selector control circuits 46 which provides control and address information to the memory unit 34 for processing the input DATA 1 from head 1. FIG. 6D depicts the memory unit 34 associated with the selector control 1 of the first channel in further detail. FIG. 6D also includes a dashed block depicting the selector control 2 and memory unit 36 of the second channel for receiving the input DATA 2 from head 2 and depicts the associated input and output signals of the second channel. The selector control 2 and the memory unit 36 are shown herein as dashed blocks for simplifying the description since the second channel of the selector control circuit is substantially identical to that of the first channel shown in FIGS. 6A-6C, while the memory unit 36 is identical to the memory unit 34 shown in FIG. 6D. Like components of FIGS. 5 and 6 are indicated by similar numbers.

Referring to FIG. 6A, a START 1 signal is supplied to a write control circuit 70 via a line 72 and is one of the three control signals shown in FIG. 5 as supplied on the control lines 48 thereof. A second control signal of lines 48 is a PASS signal supplied to a pass counter 74 of the write control circuit 70 via a line 76. The PASS signal indicates how many lines the pass counter 74 should count, that is, whether the pass period contains 87 or 88 lines. In the system employed herein by way of description, in a NTSC color television standard, the 525 horizontal lines are divided into 6 pass periods; three passes of 87 lines and three passes of 88. Thus it is necessary to provide information as to which pass period is expected, which is supplied by the PASS signal fed to both channel 1 (FIG. 6A) and channel 2 (FIG. 6D) via the line 76. In a PAL color television standard system, the 625 horizontal lines are similarly divided into a selected number of pass periods of a selected number of lines each, whereby the PASS signal identifies the number of lines assigned to each pass period. The START 1 signal initiates the start of the entire write cycle of data 1 whenever data is available at the input bus 38, and is coupled to a multivibrator 78 with Schmitt trigger input whose Q-bar output provides a START signal which is coupled to the load inputs of the pass counter 74. The Q output of multivibrator 78 is coupled to the clock input of a D-type flip-flop 80, while the PASS signal is coupled to the D input thereof. The Q-bar output of flip-flop 80 is coupled to the A input of the pass counter 74, which in turn supplies an ACTIVATE signal from its QD output which is indicative of whether the pass period is 87 or 88 lines. The ACTIVATE signal is coupled back to the counter 74 count-down input.

The START signal from multivibrator 78 also is fed to the clear input of a D-type flip-flop 82, and to the preset input of a D-type flip-flop 84, FIG. 6B. The D input of the flip-flop 82 receives the TAPE H1 signal indicative of the DATA 1 timing and previously mentioned in FIG. 5, via the line 42, while an off-tape clock TA1 is supplied to the clock inputs of the flip-flops 82, 84 via a line 86. The TA1 signal is derived from off-tape information fed to the memory unit 34 as depicted below in FIGS. 6D and 7, and is the clock equivalent of the DATA 1. The Q output of flip-flop 82 supplies a DATA LOAD signal to an AND gate 88, FIG. 6C, which supplies a WRITE LOAD signal to the load inputs of a binary counter 89 of a write address generator 90. The latter supplies the write addresses to the memory unit 34. The WRITE LOAD signal also is fed to the input of a Schmitt trigger multivibrator 92 of a write-to-read transfer circuit 94, FIG. 6C. The Q output of the flip-flop 84 is coupled to the inhibit input of the multivibrator 92. In turn, the Q output of the multivibrator 92 provides the clock for the pass counter 74. The TA1 signal also is coupled to the clock inputs of the binary counter 89. The Q outputs of the binary counter 89 supply a digital word (10 bits) which defines a WRITE 1 ADDRESS signal on a WRITE 1 address bus 96 corresponding to the bus 52 of FIG. 5. The three least significant bits (LSB) of the digital word also are supplied via an AND gate 98 to the D input of the flip-flop 84, FIG. 6B. The last bit position (QC) of the binary counter 89 is fed back to one of the inputs of the AND gate 88 as a FLYWHEEL LOAD signal which allows the binary counter 89 to continue generating the write address in the event that the TAPE H1 signal fails to appear on line 42.

The write-to-read transfer circuit 94 further includes a D-type flip-flop 100 whose D input is coupled to the ACTIVATE signal from the pass counter 74, and which is clocked via a NEW BLOCK signal from the Q-bar output of the multivibrator 92. The NEW BLOCK signal also is fed to a NAND gate 102, whose output provides a NEW WRITE 1 signal on a line 104 corresponding to the line 50 of previous mention in FIG. 5 and which initiates the write process for loading input DATA 1 into the memory unit 34. The Q output of the flip-flop 100 supplies a GO signal to an AND gate 106, whose other input receives a LAST LINE HOLD OFF (LH2) signal via a line 108 from FIGS. 6A, 6D. The LH2 signal is generated by the selector control 2 of the DATA 2 channel (FIG. 6D) and inhibits reading by the first channel via action of the write-to-read transfer circuit 94 until the second channel is through its read mode, as described below. The AND gate 106 is coupled to the D input of a D-type flip-flop 110 which is clocked by a clock RC2 via a line 112 from FIGS. 6A, 6D. The Q output of the flip-flop 110 provides a NEW READ 1 signal on a line 114, also corresponding to the line 50 of FIG. 5. The write-to-read transfer circuit 94 receives the first off-tape H signal of the two lines that are to be written via the NEW BLOCK signal from the multivibrator 92 and determines whether to enable the read mode. When the read function is to be initiated, the state of flip-flop 100 is changed via the Q-bar output of the multivibrator 92, which sets the AND gate 106 input GO to indicate that the end of the present write mode is over and a NEW READ 1 signal is required. The transfer circuit 94 then waits as directed by the logic state of the LH2 signal which indicates that the read mode of the channel 2 is finished, at which instant the AND gate 106 is released to enable the read mode. A READ DONE signal, FIG. 6A, clears the flip-flop 110 to disable it from immediately generating a NEW READ 1 signal until the present read cycle is completed. This places the first channel in the read mode to allow DATA 1 to be read from the memory unit 34. At the same time, the data selector circuit 60 (FIGS. 5 and 6D) is switched to channel 1 to enable it to supply DATA 1 being read from the memory unit 34 in response to the NEW READ 1 signal on the line 114, as further described below.

The NEW READ 1 signal also clocks a D-type flip-flop 116 of a read stop control circuit 118, FIG. 6A. The Q-bar output of the flip-flop 110 also is fed as a READ LOAD signal to the preset input of a D-type flip-flop 120 of the circuit 118, and to the 7D input of a latch 122 of a read control circuit 124, FIG. 6B. The Q output of the flip-flop 120 supplies an AGAIN signal to the second input of the NAND gate 102, FIG. 6C, and also presets the flip-flop 100. The AGAIN signal indicates that a pass of 87 is being processed and terminates the write mode and releases the channel to allow reading.

The flip-flop 116, FIG. 6A, receives the ACTIVATE signal from the pass counter 74 at its D input and its Q-bar output is coupled to the D input of a D-type flip-flop 126, whose Q output is supplied to a NAND gate 128, to the D input of a D-type flip-flop 130 and to the clock input of the flip-flop 120. The Q output of the flip-flop 80 of the write control circuit 70 is coupled to the other input of the NAND gate 128 and to the D input of the flip-flop 120 to generate the AGAIN signal. The NAND gate 128 supplies an 88 STOP signal indicative of a pass of 88 lines to the preset input of the flip-flop 130. The Q-bar output of flip-flop 116 clears the flip-flop 130 and also is fed to a NAND gate 132. The Q-bar output of the flip-flop 130 clears the flip-flop 126 and also is fed to the other input of the NAND gate 132. The output of NAND gate 132 is a LAST LINE HOLD OFF (LH1) signal which is supplied via a line 134, FIG. 6C, to the selector control 2 of the second channel, and which inhibits the read mode of the second channel until the completion of the read mode of the memory unit 34 in the first channel, as previously described and further shown in FIG. 6D. Thus the LH1 signal on line 134 of the first channel performs the same inhibit function for the second channel, as the previously mentioned LH2 signal on line 108 does for the first channel. Thus, in the event of an overlap between the second channel data and the first channel data being read out, the LH1 signal inhibits the second channel from entering the read mode until the first channel is finished reading the DATA 1 from the memory unit 34. Only upon a change of the LH1 logic state supplied to the write-to-read transfer circuit 94 by the read stop control circuit 118, is the second channel allowed to start reading. Thus any overlap between successive blocks of data is removed since a succeeding data block cannot be read out until the prior block is finished. The read stop control circuit 118 determines if the read mode must read 87 or 88 lines prior to the generation of the LH1 (or LH2) signal.

The Q output of flip-flop 130 supplies a MEMORY SELECT logic signal MS1 to the memory unit 34 on a line 136, FIG. 6C, as well as a MS2 inverted logic signal to the memory unit 36 on a line 138 via an inverter 140. The MS1, MS2 signals are fed to the data selector circuit 60 of previous mention and select either DATA 1 or 2 for output from the deskew processor circuit 18. The Q-bar output of the flip flop 130 also is coupled to a NAND gate 142 of the read control circuit 124 in FIG. 6B. The latch 122 supplies a READ BUSY signal on Q8 to the clock input of the flip-flop 126 and to a 1D input of another latch 146. The latch 146 is clocked via the RC2 clock on line 112 from FIG. 6D, and supplies the READ DONE signal of previous mention to the clear input of the flip-flop 110 of the write-to-read transfer circuit 94 to inhibit another read cycle until the present read cycle is completed. The RC2 clock also is coupled to the clock inputs of a binary counter 148 and the latch 122 of the read control circuit 124. The latch 122 also provides a Q1 output signal SECOND CLOCK to the clock input of the flip-flop 130, as well as to one input of a quad NAND gate 150. The other input of NAND gate 150 is supplied with a SECOND H signal via the Q6 output of the latch 122, which SECOND H signal also is fed to a NAND gate 152. The other input of NAND gate 152 is coupled to a FIRST H signal from the Q7 output of the latch 122, and supplies an output to the second input of the NAND gate 142. A NAND gate 154 receives the output of NAND gate 142 and also an H2 signal on a line 156 supplied from the selector control 2 of the second channel as shown in FIGS. 6A, 6D. In turn, the NAND gate 154 supplies a DATA H signal, FIG. 6C, via an inverter 158 and a line 160 which extends to subsequent playback signal processing electronics to provide corresponding system related timing signals related in time to the deskewed data on the data output bus 64 from the data selector 60. It may be seen that the read control circuit 124 is included herein primarily due to the downstream memory configuration used in the playback electronic circuits 22, which can accept only one line of data at a time. Thus the read control circuit 124 delays the read address generator 162 between two lines of data while supplying the timing signal, DATA H, downstream on line 160. The read control circuit 124 thus is not critical to the invention.

A read address generator 162, FIG. 6C, similar to the write address generator 90, includes a binary counter 163 which receives a selected DELAY signal from the NAND gate 150 at its (P) input and which is clocked by a clock RC1 on a line 164 of FIGS. 6A, 6D. The load inputs of the binary counter 163 are supplied with the READ LOAD signal corresponding to the Q-bar output of the flip-flop 110. In turn, the read address generator 162 supplies a digital word corresponding to a READ 1 ADDRESS signal to the memory unit 34 of the first channel via a read 1 address bus 166, which corresponds to the bus 52 of FIG. 5. The last bit position QC of the binary counter 163 is fed back to the (T) input thereof, as well as back to the load inputs of the binary counter 148 and an 8D input of the latch 122 via an inverter, FIG. 6B.

Referring to FIG. 6D, the memory unit 34 of the first channel is shown with various inputs thereto from the selector control 1 as well as from external sources. In addition, the selector control 2 and memory unit 36 of the associated second channel are shown in dashed blocks, and the complementary input signals for the second channel are depicted. The outputs of the selector control 1 shown in FIG. 6C are fed to the memory unit 34 as shown in FIG. 6D. More particularly, the NEW WRITE 1 and NEW READ 1 signals on lines 104, 114 respectively, are supplied to a memory 1 control circuit 170. A DATA CLOCK 1 signal corresponding to the off-tape horizontal signal related to the input DATA 1 depicted on line 42 of FIG. 5, is supplied to the circuit 170 via a line 174. The WRITE 1 ADDRESS and READ 1 ADDRESS signals on busses 96, 166 are supplied to an address select 1 circuit 176, which supplies the addresses to a memory 178 via a bus 180. The DATA H signal of FIG. 6C is supplied via the line 160 to subsequent playback electronics to provide downstream system timing for subsequent memories which receive the successive deskewed data blocks. The MS1 and MS2 signals on lines 136, 138 are fed to the data selector circuit 60 of previous mention to provide selection of the DATA 1 in the first channel or DATA 2 in the second channel, respectively, during the readout process.

A 2Fsc clock signal for read processing is supplied to a clock generator 182 via a line 184 from system timing (not shown). The clock generator 182 includes a series of inverters which, in turn, produce the various clocks used by the components in the deskew processor circuit 18; namely, a pair of clocks are supplied respectively to the usual output latches of the memory 178 and to the data selector circuit 60 via clock lines 186, while the RC1 and RC2 clocks are supplied via FIG. 6A and lines 164, 112 to the respective components in the selector control 1 of the first channel. The remaining clocks include RC3 and RC4 clocks supplied to the selector control 2 of the second channel, FIG. 6D, via lines 188, 190, and correspond in function to the RC1 and RC2 clocks of selector control 1. A pair of clocks on lines 192, similar to the clocks on the lines 186, are supplied to the usual output latches of a memory 179 of the memory unit 36 and to the data selector circuit 60 to clock the latter circuits.

It may be seen that the selector control 2 receives essentially the same input signals as does the selector control 1, as depicted in FIGS. 5 and 6A. Thus, in FIG. 6D, a START 2 signal is supplied on a line 194 to initiate the write mode in the second channel, and the same PASS signal of FIG. 6A is also supplied to selector control 2 via the line 76. The TAPE H2 signal on line 44, FIG. 5, supplies the necessary DATA 2 signal timing information. The H2 signal on the line 156 fed to the input of selector control 1, FIG. 6A, is supplied by the selector control 2, FIG. 6D, and corresponds in function to the DATA H signal generated by the read control circuit 124 at the output of NAND gate 142 of previous mention. THE H2 signal is the timing signal necessary for further processing, which is related to the data timing as generated by the selector control 2. The LH2 signal which is fed to selector control 1, FIG. 6A, on line 108, is generated by a read stop control circuit (corresponding to circuit 118) of selector control 2, and corresponds in function to the LH1 signal generated by selector control 1, FIGS. 6A, 6C, on its line 134 and which is fed back to the input of selector control 2, FIG. 6D. An off-tape clock TB1 on a line 196, FIG. 6D, corresponds to the TA1 signal on line 86 of the selector control 1, and is generated by a memory control circuit (not shown) for memory unit 36, which corresponds to the control circuit 170 for the memory unit 34. TB1 is fed to the selector control 2 on line 196. A DATA CLOCK 2 signal corresponding in function to the DATA CLOCK 1 signal on line 174, FIG. 7, of the memory unit 34, is supplied to the memory unit 36 via a line 198. The input DATA 2 is supplied to the memory 179 of the memory unit 36, via the input data bus 40 of previous mention in FIG. 5. The DATA 2 is supplied from the memory 179 to the data selector circuit 60 via the data bus 58, along with the DATA 1 on the respective data bus 56 from the memory 178. The deskewed data signals are supplied from the data selector circuit 60 on the data output bus 64 in response to the MS1 and MS2 signals.

Figure 7:
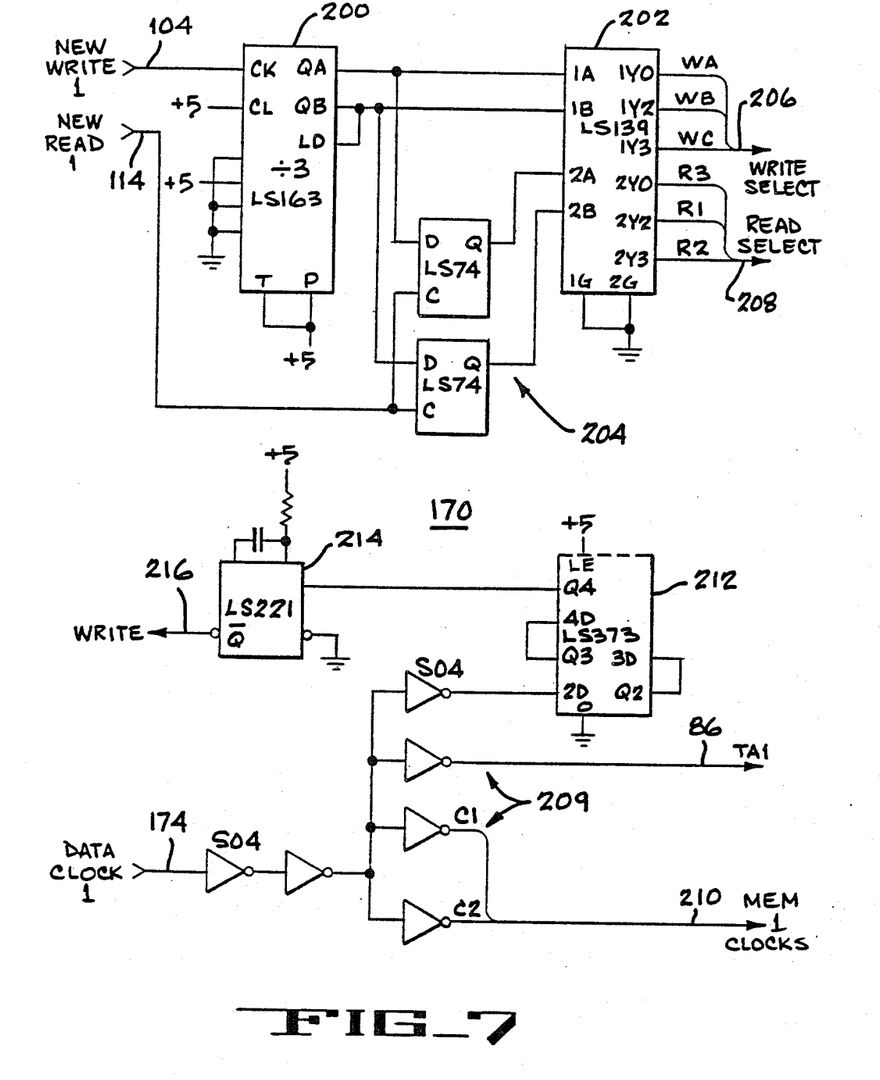
FIG. 7 is a schematic diagram of a memory control circuit for the memory unit 34 (and 36) of FIG. 6D.

FIG. 7 illustrates an implementation of the memory 1 control circuit 170. The memory control 2 circuit (not shown) in the second channel is similar. The NEW WRITE 1 signal is supplied on the line 104 to the clock input of a ÷3 counter 200, whose QA, QB outputs are fed to the 1A, 1B inputs of a decoder 202. The NEW READ 1 signal on line 114 clocks a pair of D-type flip-flops operating as a latch 204, whose D inputs are coupled to the Q outputs of the counter 200. The Q outputs of the latch 204 couple to the 2A, 2B inputs of the decoder 202. The latter supplies WRITE SELECT and READ SELECT signals on respective lines 206, 208 to the memory 178, as shown in FIG. 6D. Three WRITE SELECT (WA, WB, WC) and three READ SELECT (R1, R2, R3) signals are shown herein due to the particular memory configuration employed, which includes three memories of two lines capacity. Each memory is sequentially selected as decoded by the decoder 202 which supplies the three corresponding WRITE SELECT signals to sequentially load data in the three memories, and which supplies three READ SELECT signals to sequentially read out the stored data. Thus the inputs to the three memories forming memory 178 are sequentially loaded via the NEW WRITE 1 signal while being sequentially read out via the NEW READ 1 signal.

The circuit 170 also receives the DATA CLOCK 1 signal on line 174 fed to a series of inverters 209, and supplies the TA1 signal on the line 86 and a pair of memory clocks on lines 210. A WRITE signal for write enabling the memory 178 is supplied to the address select 1 circuit 176, FIG. 6D, via a line 216, a latch 212 and a multivibrator 214.

What is claimed is:

1. A circuit for deskewing successively occurring blocks of data from two channels wherein overlap in time may occur between the end of a first block of data from a first channel relative to the beginning of a second block of data from a second channel, comprising:
   means for supplying memory read and write control signals, said read control signal being independent of the write control signal;
   memory means in said first and second channels for receiving the first and second data blocks respectively, for alternately storing the successive data blocks in response to the write control signal; and
   data control means for determining the occurrence of overlap between the successive data blocks and for inhibiting the read control signal from reading the second data block from the memory means for a delay time period corresponding to any overlap.

2. The circuit of claim 1 including:
   means for providing off-tape timing signals to the data control means which are indicative of the timing of the alternately stored blocks of data; and
   wherein said data control means enables read out of the first stored block of data in the first channel via the read control signal and thereafter enables the read out of the second stored clock of data in the second channel at the end of the delay time period.

3. The circuit of claim 2 wherein:
   said memory means includes first and second memories in the first and second channels, for alternately storing the first and second blocks of data respectively in response to the write control signal; an
   said data control means includes first and second data selector control circuits in the first and second channels, for receiving the off-tape timing signals for determining thereform any data block overlap.

4. The circuit of claim 3 wherein the first and second data selector control circuits include:
   pass circuit means for supplying an activate signal indicative of the number of horizontal television lines in each block of data; and
   means responsive to the pass circuit means for further inhibiting the reading of data from a memory in response to the activate signal.

5. The circuit of claim 4 wherein the first and second data selector control circuits include:
   write-to-read transfer circuit means for receiving the off-tape timing signals and the activate signal and for enabling the reading of data from a memory in response to both the timing and activate signals.

6. The circuit of claim 3 further including:
   data selector means coupled to the first and second memories in the first and second channels, for selecting the respective blocks of data from alternate channels in response to the read control signals of the first and second data selector control circuits.

7. A circuit for deskewing successively occurring first and second data signals in first and second channels respectively, comprising:
   first memory means in the first channel for storing the first data signal;
   second memory means in the second channel for storing the second data signal;
   data selector control means for generating a delayed switching signal indicative of any overlap in time between the occurrence of the second data signal relative to the first data signal; and data selector means responsive to the data selector control means for selecting the first data signal from the first memory means, and then selecting the second data signal from the second memory means in response to the delayed switching signal.

8. The circuit of claim 7 wherein the data selector control means includes:

means for supplying off-tape timing signals indicative of any overlap between the stored first and second data signals; and read control means receiving the off-tape timing signals for generating the delayed switching signal in response to the extent of any overlap between the data signals.

9. The circuit of claim 8 wherein the data selector control means further include:

pass counter means for supplying an activate signal indicative of the time period of each of the first and second data signals; and said read control means being further responsive to the activate signal when generating the delayed switching signal.

10. The circuit of claim 8 wherein the read control means includes first and second circuits integral within the data selector control means for respectively supplying a first read enable signal to read out the second data signal and a second read enable signal to read out the first data signal, said first and second read enable signals being further responsive to the delayed switching signal in the event of an overlap.

11. The circuit of claim 7 wherein:

said first and second memory means include respective write enable circuits, and respective read enable circuits which are independent of the write enable circuits; and said data selector control means include first and second selector control circuits for supplying selected control signals to the first and second write and read enable circuits respectively.

12. The circuit of claim 11 wherein the first and second selector control circuits respectively include:

first and second write control means for loading the successive first and second data signals into respective first and second memory means as the data signals are received;

first read control means for reading the stored first data signal from the first memory means while inhibiting the read out of the stored second data signal; and second read control means for reading the stored second data signal from the second memory means while inhibiting the read out of the stored first data signal.

13. The circuit of claim 12 wherein the first and second read control means respectively include:

a first transfer circuit for enabling the first read enable circuit after the first write enable circuit has loaded the first memory means;

a second transfer circuit for enabling the second read enable circuit after the second write enable circuit has loaded the second memory means;

a first read stop circuit for inhibiting the second transfer circuit as long as the first transfer circuit enables the first read enable circuit; and a second read stop circuit for inhibiting the first transfer circuit as long as the second transfer circuit enables the second read enable circuit.

14. The circuit of claim 13 wherein the first and second read control means further respectively include:

first and second pass circuit means respectively coupled to the first and second transfer circuits and to the first and second read stop circuits for supplying thereto respective activate signals indicative of the time period of each of the first and second data signals.

15. A circuit for deskewing successive blocks of data recovered along with respective data block timing signals by multiple playback heads in respective channels, wherein the blocks of data include a selected number of television lines corresponding to each pass of the heads, and wherein overlap in time may occur between successive blocks of data being recovered via respective channels, comprising:

a first memory unit for storing a first data block in a first channel;

a second memory unit for storing a second data block in a second channel;

a first selector control circuit coupled to the first memory unit for loading the first data block in response to its timing signal;

a second selector control circuit coupled to the second memory unit for loading the second data block in response to its timing signal;

said first and second selector control circuits including respective first and second circuit means for determining any overlap between the first and second stored data blocks; and data selector means coupled to the first and second memory units for selecting respective data blocks alternately from the channels one at a time in response to the determined overlap by the first and second circuit means.

16. The circuit of claim 15 including:

first and second pass counter circuits coupled to the respective first and second circuit means for supplying first and second activate signals indicative of the number of television lines in each pass of the heads; and said first and second circuit means include first and second write-to-read transfer circuits coupled to respective first and second pass counter circuits and responsive to the activate signals and the data block timing signals for supplying a data block read signal to the corresponding memory unit and an associated data select signal to the data selector means.

17. The circuit of claim 16 further including:

first and second read stop circuits coupled to respective first and second pass counter circuits and to first and second write-to-read transfer circuits for supplying respective first and second last line hold-off signals to the second and first memory units respectively, for inhibiting reading by the second memory unit until read out of the first memory unit is finished, and vice versa.

18. A method for deskewing successive blocks of data from responsive channels wherein overlap may occur between the beginning of one data block from one channel relative to the end of a previous data block from another channel, comprising:

storing the successive data blocks from alternate channels as they occur in time;

determining the presence of overlap between a second stored data block and a previously stored data block from alternate channels;
reading out the previously stored data block while inhibiting the read out of the second stored data block in response to the presence of overlap;
reading out the second stored data block only after the previously stored data block has been read out and overlap is absent; and
outputting the successive data blocks in a continuous end-to-end relationship.

19. The method of claim 18 including:
determining the time period of each of the successively stored data blocks; and
delaying the reading out of the second stored data block in response to the determined time period of the previously stored data block.

* * * * *